Patented July 17, 1934

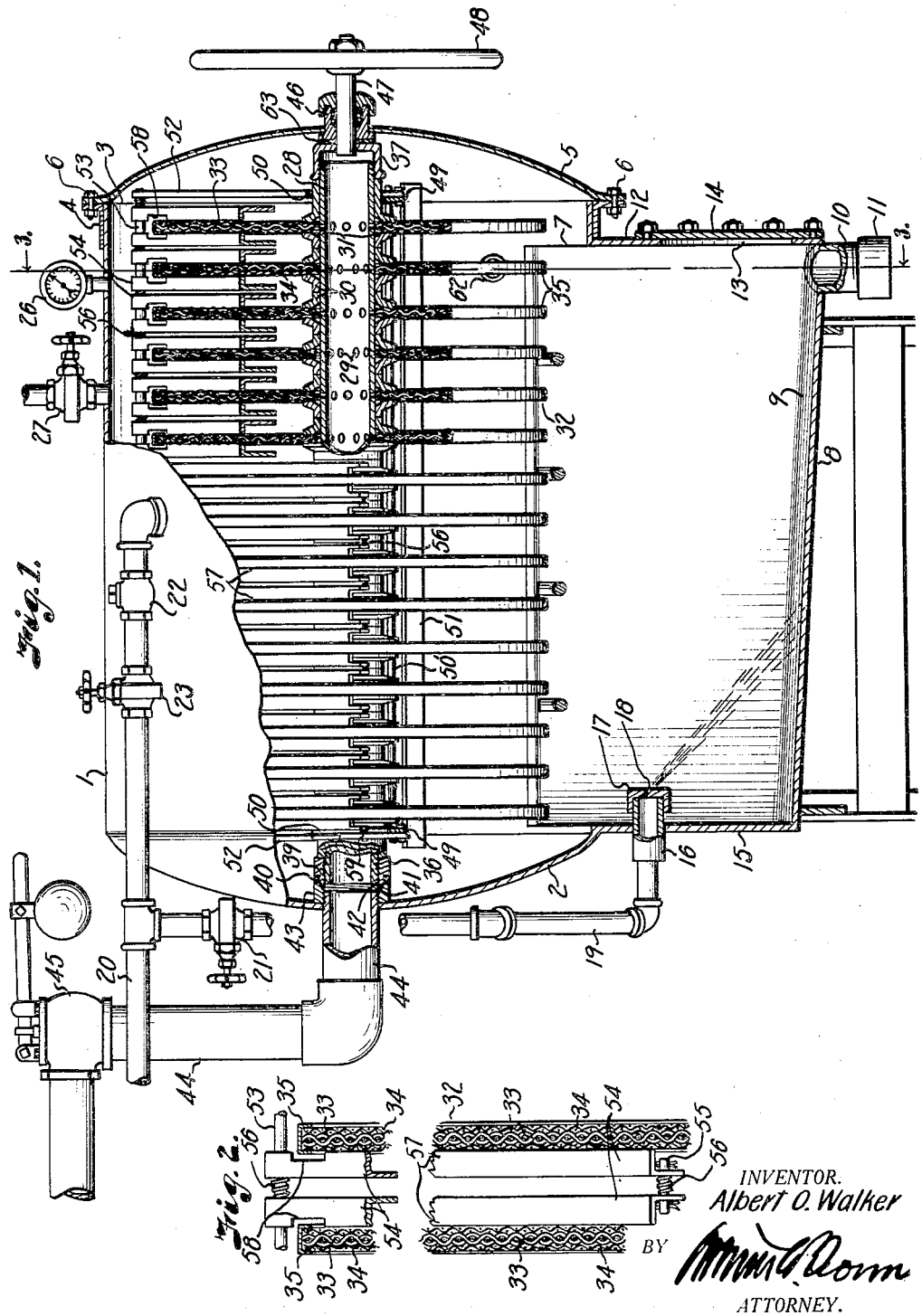

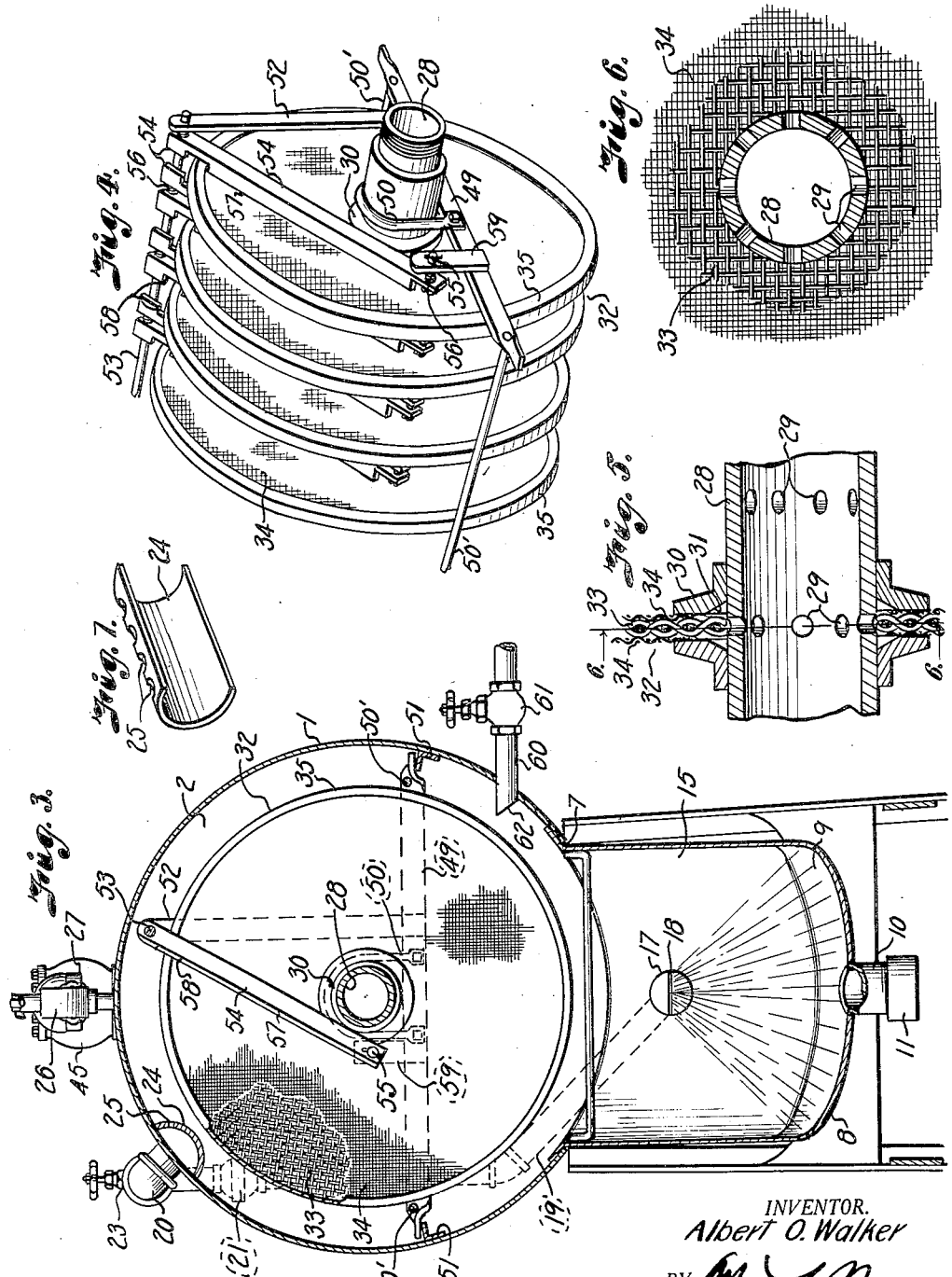

1,967,070

UNITED STATES PATENT OFFICE 1,967,070

PRESSURE FILTER

Albert O. Walker, Independence, Mo., assignor to Tru-Way Manufacturing Company, Kansas City, Mo., a corporation of Missouri Application October 12, 1931, Serial No. 568,271

3 Claims. (Cl. 210—200)

This invention relates to pressure filters, and more particularly to filters used by cleaning establishments to remove foreign matter from cleaning fluid so that the same need not be thrown away when it becomes dirty.

A further object is to construct a pressure filter which can be readily cleaned without taking the same apart.

A further object is to construct a pressure filter in which a supporting member is used for the filtering screens which prevents their collapse but does not interfere with the flow of the filtered liquid.

A further object is to construct a pressure filter which is so arranged that the filtering screens can be cleaned while the filter is in operation.

A further object is to construct a pressure filter which is so arranged that a predetermined pressure can be maintained within the filter automatically.

In accomplishing these and other objects of the invention, I have provided improved details of structure, the preferred form of which is illustrated in the accompanying drawings, wherein:

Fig. 1 is a side view of my device with parts broken away and in section.

Fig. 2 is an enlarged fragmental view with parts in section of a filter plate and scrapers.

Fig. 3 is a cross section taken on the line 3—3 of Fig. 1.

Fig. 4 is a perspective view of several of the filter plates showing the scrapers in position.

Fig. 5 is an enlarged fragmental section of one of the filter plates and its support.

Fig. 6 is a cross section taken on the line 6—6 of Fig. 5.

Fig. 7 is a perspective view of the inlet baffle.

Referring to the drawings in detail:

1 represents a tank having a domed end 2 and an open end 3 surrounding which is a flange 4 having a head 5 secured thereto by means of bolts or the like 6. The tank which lies horizontally has a portion of its wall cut away to form an opening 7, and secured in this opening is a sump 8 having an inclined bottom 9.

At the lowest portion of the bottom is an outlet pipe 10 which is normally closed by means of a cap 11 and is for the purpose of draining the tank for cleaning the tank. The end wall 12 of the sump is adjacent the outlet pipe 10 and is provided with a handhole 13 which is normally closed by means of a plate or cover 14.

The opposite end wall 15 of the sump has a nipple 16 extending therethrough which is provided on its inner end with a cap or tip 17 having a slot 18, the edges of which are so arranged that a downwardly directed fan-shaped flat stream will issue therefrom, strike the bottom 9, and scour sediment therefrom.

The opposite end of the nipple 16 is attached to one end of a conduit 19, the opposite end of which is attached to a supply conduit 20. A valve 21 is carried by the conduit 19 so that the flow of liquid therethrough can be prevented.

The conduit 20 enters the tank 1 near its upper edge at a point intermediate its end and is proprovided with a check valve 22 and a shut off valve 23. The conduit 20 is adapted to have liquid forced therethrough under pressure by means of a pump (not shown).

Located on the inside of the tank 1 and enclosing the end of the conduit 20 is a baffle 24 having openings 25 therein. The purpose of this baffle is to prevent the stream from directly striking the filter units and washing of the filter aid, and also to divide it into a plurality of gently flowing streams; consequently, agitation of the liquid in the tank by the incoming liquid is reduced to a minimum, and the heavier particles of foreign matter in the liquid can settle in the sump by gravity and will not be deposited on the filter plates hereafter to be described.

The tank 1 is also provided with a pressure gauge 26 and a valve controlled air vent 27 which permits the escape of air so that the tank may be completely filled with liquid.

Extending centrally and longitudinally of the tank 1 is a rotatable hollow shaft or tube 28 which is provided with parallel, circumferentially arranged rows of openings 29. The openings in adjacent rows are staggered relative to each other to prevent excessive weakening of the shaft 28.

Slidably mounted on the shaft 28 are ferrules or sleeves 30 having outwardly extending flanges surrounding one end, and which have their edges 31 adjacent the flanges bevelled so as to form chambers or pockets adjacent the openings 29. The ferrules 30 are arranged on the shaft 28 in pairs with the flanges opposing each other, and between the flanges of each pair of ferrules is a filter plate or unit 32.

Each filter unit consists of a central porous disk or member 33 which is preferably formed of heavy wire screen. Against the opposite faces of the central member 33 are complementary members 34 formed of closely woven material, preferably wire cloth. A U-shaped frame 35 surrounds the outer edges of the members 33 and 34, thus binding the members together into a filtering unit. A central opening is formed through each of the units so that they can be readily slipped over the shaft 28.

The manner of assembling the filter units on the shaft is as follows:

A sleeve 36 is screwed onto one end of the shaft, and a ferrule is then slipped on the shaft in such a manner that its cylindrical end will abut the sleeve. A filtering unit is then slipped onto the shaft and rests against the flange of the ferrule. A ferrule is then slipped onto the shaft and has its flange against the filtering unit. This is followed by a ferrule with its cylindrical portion abutting the cylindrical portion of the preceding ferrule. This is succeeded by a filter unit, two ferrules placed end to end as just described, and so on, until the required number of units have been placed on the shaft, after which a cap 37 is screwed onto the opposite end of the shaft and the ferrules and filter units are clamped on the shaft between this cap and the sleeve 36 so that they are immovable relative to the shaft. The ferrules are of such length that the filter units will be positioned directly over the openings 29, thereby permitting liquid which passes through the members 34 to pass therethrough and into the hollow shaft 28.

The sleeve 36 has a reduced cylindrical portion 39 adjacent its outer end which acts as a seat for a gasket 40. The end of the sleeve 36 extending beyond the gasket sleeve is bevelled as at 41, and is received in a tapered socket 42 formed in one end of a sleeve 43 located inside the tank 1 and on a conduit 44 which extends centrally through the closed end 2 of the tank 1. The conduit 44 is provided with an automatic pressure regulating valve 45 by means of which a predetermined pressure can be maintained in the tank 1 during its operation. The necessity of maintaining this pressure will be explained in detail later.

The head 5 is provided at its center with a packing gland 46 through which a shaft 47 extends. This shaft is provided on its outer end with a hand wheel 48 and has its other end attached to the cap 37 in such a manner that the shaft 28 and the filter units carried thereby may be rotated by turning the hand wheel 48.

The ferrules at each end of the shaft 28 rest on bars or supports 49 extending transversely of the tank. U-shaped tie members 50 are secured to the bars 49 and pass on both sides and over the top of the ferrules, and thus prevent the assembled filtering units from shifting longitudinally of the bars, but are not tight enough to prevent rotation of the filtering units and shaft. The bars 49 also support the assembled filtering units and thus relieve the tapered end 41 of the sleeve 36 and the shaft 47 of this strain.

The bars 49 are connected by tie rods 50' and are supported at their ends by slides 51 extending longitudinally along the sides of the tank 1 to which they are secured in any well known manner such as spot welding.

Projecting upwardly from the bars 49 are arms 52 which carry a shaft or rod 53. Scrapers 54, substantially L-shaped in cross section, are pivotally mounted in opposing pairs at one end on the shaft 53, and each pair is loosely connected at the opposite end by a pin 55. Resilient thrust members 56, such as springs or the like, are interposed between the scrapers of each pair so as to thrust them apart and bring the scraping blades 57 into scraping relation with the members 34 of the filter units, which is made possible by notching each blade as at 58 so that the blade will not contact the frame 35 of the unit. The scrapers extend diagonally downwardly and are supported adjacent their free ends on the ferrules.

The bars 49 are also provided with lugs 59 which carry thrust members similar to the members 56 to contact the scrapers on the outside of each of the end filter units, and similar thrust members are interposed between the arms 52 and the outermost scrapers for the same reason.

A drain 60 having a valve 61 is connected to the tank a short distance above the sump, and has its inner end 62 cut diagonally so as to form a hood or shield and prevent sediment from lodging in the drain and clogging it.

A thrust member 63 is interposed between the cap 37 and packing gland 46 which keeps the tapered end of the sleeve 36 in close contact with the tapered socket 42, and this, in connection with the gasket 40, prevents unfiltered fluid from entering the conduit 44 at that point.

If desired, the ferrules may have the flanges attached to the filter units.

The operation of my device will be explained as being a continuous operation, such as is commonly used in dry cleaning plants where the cleaning fluid is being withdrawn from the cleaning vat, passed through the filter and returned to the vat.

The device is assembled as previously described, the conduit 44 connected with the cleaning vat, the conduit with a suitable pump, and the pump in turn with the vat. The pump and vat have not been shown or described as they form no part of the present invention.

The valves 21 and 61 are closed and the drain 10 closed either by the cap 11 or a suitable valve.

A batch of fresh cleaning fluid is placed in the vat and a quantity of filter aid mixed therewith. The valves 23 and 27 are opened and the pressure valve set for the desired pressure. The pump is then started, and forces the fluid and filter aid into the tank 1 where it strikes the baffle 24, which breaks up the stream, causing some fluid to enter the tank in opposite longitudinal directions and some to pass through the openings 25 in the baffle. This not only reduces agitation of the liquid in the tank to a minimum but insures an even distribution of the filter aid.

As the fluid containing the filter aid rises in the tank it gradually submerges the filter units and passes through the members 34, which, being closely woven, prevent the passage of the filter aid which is deposited as a film thereon and which prevents lint and other substances from entering the meshes of the members 34. When the tank 1 is filled with fluid the valve 27 is closed.

As the fluid passes through the members 34 of the filter units it passes along the support 33 and enters the hollow shaft 28 through the openings 29, rising in the conduit until it is stopped by the pressure valve 45, which has been set for a predetermined pressure and which remains closed until the predetermined pressure has been reached, when it opens and permits the liquid to pass on to the vat.

When the filter units have been properly coated with filter aid, which can readily be ascertained by opening the valve 45 and observing the pressure gauge 26, which will indicate pressure in the tank due to the resistance offered to the passage of fluid into the filter units by reason of the film of filter aid thereof, the fluid in the vat is ready to be used for cleaning purposes, and as it is being constantly circulated by the pump all lint and muck will pass over into the tank where the fluid is comparatively quiescent and the heavier particles will settle in the sump by gravity, while the lighter particles are caught and retained by the filter aid on the units.

The deposit of the lighter dirt particles on the filter aid will gradually increase in thickness and offer an increasing resistance to the passage of fluid into the filter units, which increase of resistance causes a rise of pressure within the tank and is indicated on the pressure gauge, and when the pressure in the tank reaches a certain point it becomes necessary to clean the filter units. This is done by grasping the hand wheel and rotating it, which also rotates the filter units, causing the scrapers to remove all of the deposited material from the members 34 which slides down the inclined scrapers and lodges in the sump, after which the filter plates are recoated with fresh filter aid.

When the operation of the pump ceases, the check valve 22 and pressure regulating valve close, thereby retaining the fluid in the tank under pressure, which prevents the filter aid from loosening and sliding from the filter plates during an idle period or when the plant is closed.

In cleaning the tank, the valve 61 is opened and the fluid in the tank above the sump is drained into a suitable receptacle; the handhole is then opened and the muck which has gathered in the sump scraped out. The handhole is then closed and the outlet pipe 10 opened, after which the valve 21 is opened and the valve 23 closed, and the pump started, which will discharge fluid under pressure through the slot 18, flushing out the sump.

Should inspection of the entire filtering unit be desired, the head 5 is loosened and the entire unit removed or slid out of the tank.

What I claim and desire to secure by Letters Patent is:

1. A pressure filter comprising a tank, including a filter chamber and a sump below and communicating with said chamber, having an inclined bottom and a controlled outlet at the lower end of said bottom, a hollow shaft extending through said filter chamber having spaced series of ports therein, filter units on said shaft in radial alignment with respective series of ports, means operable from the exterior of the tank for rotating said shaft and filter units, a frame in said chamber including cross bars suspended from said shaft at opposite ends of the chamber, tie rods connecting said bars, legs on said cross bars, a tie rod connecting said legs, scrapers suspended between said units from said last named tie rod having free ends supported by said shaft, means yieldingly urging said scrapers toward adjacent filter units, a dirty liquid line leading to said chamber, and a filtrate line leading from said shaft.

2. A pressure filter comprising a tank, including a filter chamber and a sump below and communicating with said chamber, having an inclined bottom and a controlled outlet at the lower end of said bottom, a hollow shaft extending through said filter chamber having spaced series of ports therein, filter units on said shaft in radial alignment with respective series of ports, means operable from the exterior of the tank for rotating said shaft and filter units, a frame in said chamber including cross bars suspended from said shaft at opposite ends of the chamber, tie rods connecting said bars, legs on said cross bars, a tie rod connecting said legs, scrapers suspended between said units from said last named tie rod having free ends supported by said shaft, other shorter legs on said cross bars paired with the first named legs at opposite sides of the shaft, scrapers carried by said paired legs, means yieldingly urging said scrapers toward adjacent filter units, a dirty liquid line leading to said chamber, and a filtrate line leading from said shaft.

3. In a pressure filter including a tank, a shaft within the tank, spaced filter units mounted on the shaft, normally idle means connected with the shaft and operable exteriorly of the tank to rotate the filter units, a frame supported in the tank including cross bars extending transversely at opposite ends of the tank, legs on said cross bars, a tie rod connecting the legs, scrapers suspended between said filter units from said tie rod and having free ends supported by said shaft, and means yieldingly urging said scrapers toward adjacent filter units.

ALBERT O. WALKER.